United States Patent [19]
Bahnemann et al.

[11] Patent Number: 5,512,943
[45] Date of Patent: Apr. 30, 1996

[54] VIDEO MONITOR CONTRAST REFERENCE GRAY SCALE APPARATUS AND METHOD OF USE THEREOF

[75] Inventors: Volker W. Bahnemann, Greenwich, Conn.; Stanislaw Loth, Nanuet, N.Y.

[73] Assignee: Arriflex Corporation, Blauvelt, N.Y.

[21] Appl. No.: 227,417

[22] Filed: Apr. 14, 1994

[51] Int. Cl.$^6$ ................................................ H04N 17/00
[52] U.S. Cl. ..................... 348/177; 348/254; 348/334; 348/671
[58] Field of Search .................... 348/254, 671, 348/678, 184, 189, 177, 28, 334, 333, 342, 360, 222, 202.14; H04N 17/00

[56] References Cited

U.S. PATENT DOCUMENTS

| | | | |
|---|---|---|---|
| 4,101,928 | 6/1978 | Sato et al. | 358/28 |
| 4,345,271 | 8/1982 | Sekiguchi | 358/55 |
| 4,568,975 | 2/1986 | Harshbarger | 348/189 |
| 4,730,214 | 3/1988 | Lambert et al. | 348/189 |
| 4,939,581 | 6/1990 | Shalit | 348/333 |
| 5,033,015 | 6/1991 | Zwirn | 348/189 |

*Primary Examiner*—Victor R. Kostak
*Assistant Examiner*—Juan G. Acosta
*Attorney, Agent, or Firm*—Anderson Kill Olick & Oshinsky

[57] ABSTRACT

A video monitor contrast reference gray scale apparatus, and method of use thereof, wherein the apparatus comprises a reference gray scale housing, a reference gray scale which comprises a plurality of fields which provide a contrast range on the reference gray scale, a light source which is located inside the reference gray scale housing and which provides illumination to the reference gray scale, and a power supply for providing power to the light source. The reference gray scale is located in the reference gray scale housing, and further, the power supply provides power to the light source so as to provide illumination of the reference gray scale. A method for utilizing the apparatus for matching a contrast range of a camera video assist with a contrast range of a film camera negative. A method for matching a contrast range of a reference gray scale with a contrast range of a film camera negative, in conjunction with an adjustable contrast filter device and/or a camera viewfinder ocular.

11 Claims, 11 Drawing Sheets

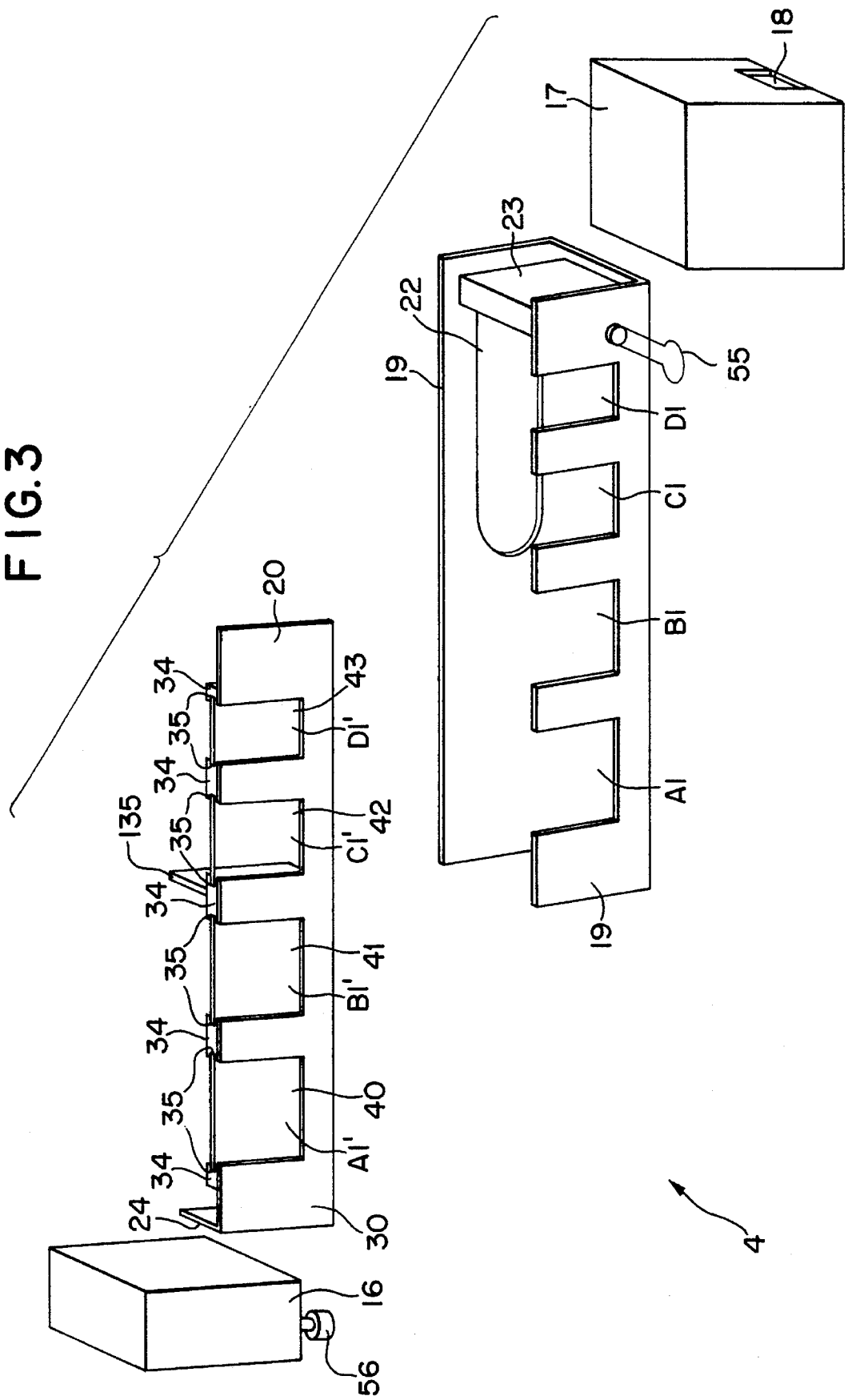

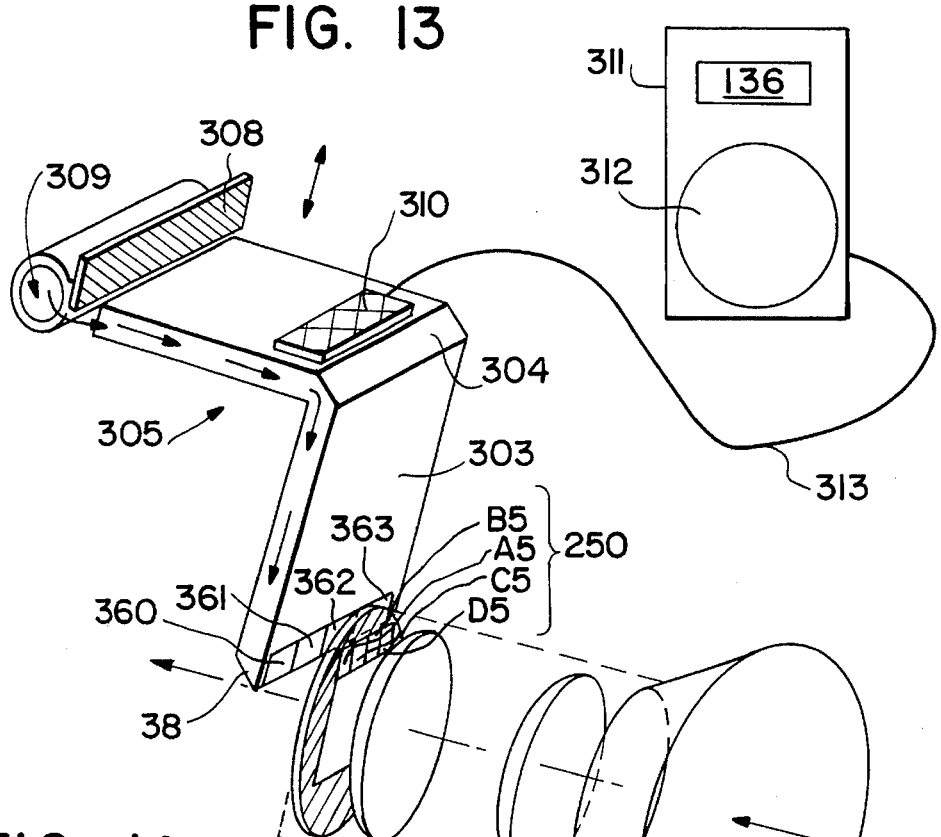
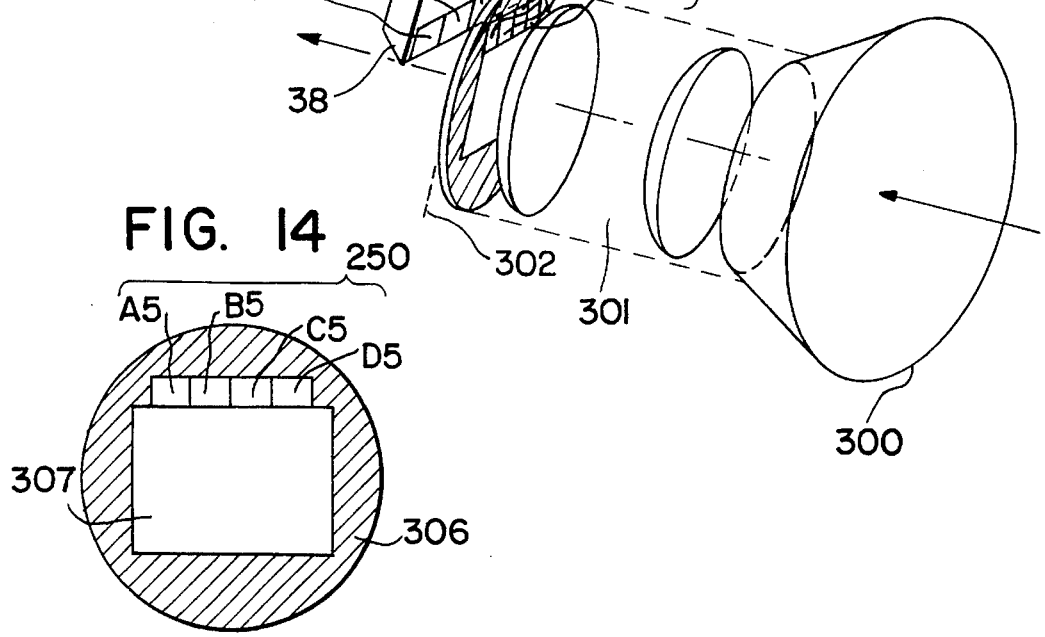

VIDEO MONITOR CONTRAST REFERENCE GRAY SCALE APPARATUS AND METHOD OF USE THEREOF

FIELD OF THE INVENTION

The present invention relates to a video monitor contrast reference gray scale apparatus, and method of use thereof, and in particular, to a video monitor contrast reference gray scale apparatus, and method of use thereof, which is utilized in conjunction with video assist cameras and video monitors in order to control the image which is exposed on film.

BACKGROUND OF THE INVENTION

Film camera video assist systems play an important role in motion picture production. When the film camera video assist system was first used, it provided only a rough check of what the film camera was recording. Its quality was far inferior to the quality of the big screen projected dailies. The film camera video assist system served to assist both the Director, by providing an additional look at the actor(s) performance, and the Director of Photography or Cinematographer, who could check the camera operator's work. Once the film camera video assist equipment became more sophisticated and flicker free, and with higher image resolution, the film camera video assist system opened new avenues and possibilities in the area of improving the motion picture filming process.

In addition, film camera video assist systems have proven to be very useful in certain areas of motion picture production. By recording a time code(s) on film and video, film camera video assist recording may be used for editing film, which allows the film to be shot and checked on the same day. The Director may use the film camera video assist recording as an immediate "proof" so as to determine whether the editing process shows that any shots are missing, or whether some shots may need to be taken over again. The Producer may use the film camera video assist recording as a means by which to effect an immediate editing process and, therefore, render unnecessary the printing of dailies, thereby speeding up the filming process and saving money. For the Director of Photography or Cinematographer, however, the video assist control of the image (i.e., manipulating the image through the video assist) is a poor substitute for screened dailies, which provide much greater technical control over the photographed and/or the projected image.

SUMMARY OF THE INVENTION

The present invention serves to provide a video monitor contrast reference gray scale apparatus and method of use thereof, which serves to overcome a lower contrast range(s) of a film camera video assist, which may typically be 1:60, when viewing the photographed image on a video monitor, so as to allow for a use or a "reading", by observation, of a higher contrast range for film which is typically 1:128.

The apparatus of the present invention also serves to provide a video monitor contrast reference gray scale and method of use thereof, which provides for a visual lighting and an exposure control of the photographed image which features are especially important when dealing with shadow areas in the filming process.

The apparatus and method of the present invention further serves to provide for a determination of the contrast range of a film image, between the darkest and the brightest of the exposed objects, and in addition, serves to facilitate a setting of a control monitor in accordance with an acceptable contrast range of the video equipment which is utilized.

The apparatus and method of the present invention serves to provide a video monitor reference gray scale and method of use thereof, which, when utilized in conjunction with an adjustable contrast filter equipment or device, provides for a viewing of a resulting effect, on a video monitor, which will be the same as that which is, or which is to be, recorded on film. The apparatus and method of the present invention also serves to provide a video monitor contrast reference gray scale which, when utilized in conjunction with a camera viewfinder, allows a viewer to view the exact contrast range which can be, or which is to be, recorded on film.

The video monitor contrast reference gray scale apparatus of the present invention is comprised generally of a base structure, a power supply, a light box housing and a light box housing support means. In a preferred embodiment, the base structure provides support for the power supply and for the light box housing support means. The power supply provides power to the light box housing. The power supply is provided with a knob, for adjusting, and for varying, the output of the power supply, a scale for use in conjunction with the knob, and an on/off switch and a pushbutton switch, which may be utilized in order to provide sufficient power to power or to ignite a light bulb which is located inside the light box housing. The power supply provides power to the light box housing via a suitable supply line.

The housing support means comprises a base support, which is attached to, and which is located on, the base structure. The housing support means also comprises a vertical support post or member which is connected with the base support, a support bracket, which is slidably movable along the vertical post, and which may be secured at a desired location along the vertical post by tightening a bracket adjustment screw which may be utilized with the arrangement. The support bracket has connected thereto, a horizontal post or member, which mates with, or which is connected to the light box housing, thereby allowing the housing to be adjustable horizontally. In this manner, the horizontal post, in conjunction with the remainder of housing support means, provides support for the light box housing.

The light box housing has a reference gray scale located on the front side thereof. In a preferred embodiment, the light box housing also has a left end cover and a right end cover. The right end cover has an opening on its right side which facilitates an insertion, or connection, of the horizontal post or member therein or thereto, so as to provide a means for connecting the light box housing with the housing support means. The light box housing may be slid along the horizontal post for horizontal positioning and may be locked in place by tightening an adjustment screw.

The reference gray scale has a plurality of transparent rectangular fields which are arranged in diminishing size, from left to right, respectively, or vice versa. While, in a preferred embodiment, the reference gray scale has four fields, the reference gray scale may have any desired number of fields, of a rectangular or any other suitable shape.

The light box housing is also comprised of a housing and a frame. The light box housing also comprises a light box housing adjustment screw. The housing has, on its front side, cut-outs or fields which range in diminishing size, from left to right, respectively, or vice versa. The housing also has a top side. Located inside the housing is a light bulb, which is mounted in a socket which is located at the end of the housing. The socket is connected to the supply line of the power supply. In this manner, electrical power is supplied to the socket from the power supply in order to provide power to the light bulb.

The light box housing is also comprised of a frame. The front side of the frame has rectangular fields, which correspond in size and shape to the fields of the housing, respectively. Located between the middle fields, on the interior side of the frame, is a mask which protrudes from the inner wall of the frame. The mask serves to partially shade one or more of the fields from direct illumination by the light bulb.

Located adjacent to each of the fields of the frame, on the inner side thereof, are pocket-like supports which have grooves therein. The supports facilitate the insertion, and retention therein, of light filters for each of the fields. The filters may be easily insertable and removable from the supports and may be changed depending upon the desired application.

The left end cover is connected to the left end of the frame, while the right end cover is connected to the right end of the housing and adjacent to the light bulb socket. The end covers are chosen so that their top portions extend beyond the top of the frame and the housing, respectively, so as to provide openings for a ventilation of the interior of the housing. The frame is slid into the housing and is slidably movable therein so that the fields of the frame are slidably positionable in relation to the fields of the housing.

The frame may be secured, relative to the housing, by tightening a locking screw which provides a means by which to secure the frame to the housing. Another locking screw may be utilized in order to adjust the position of the housing along the horizontal post. The slidability of the frame, with respect to the housing, facilitates an easy changing of the filters if such is necessary or desired.

Each of the filters may have a diffusion foil placed on the rear side thereof. The filters may also have filter numbers assigned thereto. Certain filters may also be provided with a matte surface.

In a preferred embodiment, the darkest field is the largest field which is located on the frame, while the brightest field is the smallest field which is located on the frame. The middle fields have a gradual increase in brightness from the darkest side to the brightest side. The fields may be easily changed and exchanged with other fields, which may have different contrasts, so as to establish a desired contrast range between the fields. It is also important to note that the filters, which serve to comprise the reference gray scale, may also be balanced with color filters in order to match the light of a video monitor.

Once the frame is positioned within the housing, so that the desired field alignment is established, the frame and the housing may be secured with relation to, and to one another, with a locking screw or other suitable means.

The light box housing provides illumination to the fields and their respective filters, from behind the filters, via the light bulb. With the light bulb illuminated, the light box housing, in conjunction with the respective fields of the housing and the frame, along with the filters, provide the reference gray scale which has a plurality of contrast shades. The contrast shades range in contrast from black to white, or from a highest contrast to a lowest contrast. The reference gray scale, also referred to as a gray transparent scale, which results, may be utilized in order to perform a contrast adjustment of the filming equipment.

In a preferred embodiment, the housing is painted white on its interior and provides a reflected light filter illumination, which has a pre-designated color temperature, which is provided so as to match the color temperature of a video screen.

Light intensity adjustment and/or control of the reference gray scale illumination is facilitated by the power supply, with the level or intensity of the illumination controlled by an adjustment knob.

In a preferred embodiment, the apparatus of the present invention may be placed with its reference gray scale adjacent to a video monitor so that it is adjacent to the video monitor screen.

The apparatus of the present invention may be utilized in order to set up a video monitor gray scale image according to the contrast range of a film camera negative. In such an arrangement, for setting up a video monitor gray scale image, a gray scale, which is a reflective light gray scale and which has a plurality of contrast fields, is illuminated with a key light of the motion picture filming set. The contrast fields of the gray scale range from black to white in a diminishing order.

The arrangement comprises a film camera which has a camera video assist which is utilized in conjunction therewith. The camera video assist also has a gain control setting or a video assist adjustable diaframe. The film camera lens also has an F stop setting diaframe which is set for the key light of the motion picture set. The camera video assist is connected so as to receive a portion of the light from the camera viewfinder's light path.

The video assist camera is connected or linked, either via a cable or a wireless transmission system, to a video monitor which has a screen. The apparatus of the present invention is placed adjacent to the video monitor so that the reference gray scale of the apparatus is located adjacent the video monitor screen.

With the black and white gray scale illuminated by the key light of the set, and with the film camera set up to view the gray scale, a video black and white or image gray scale will appear on the video monitor screen. The image gray scale, which appears on the video monitor screen, has contrast components which correspond to the fields of the reference gray scale.

In order to reproduce the gray scale which is positioned in front of the camera and which is illuminated by the key light, in accordance with the film camera lens F stop setting and video assist settings, so that the gray scale will be reproduced on the video monitor screen and so as to provide a corresponding contrast scale or "reading" with the reference gray scale, the following adjustment steps must be performed. The video assist gain knob should be adjusted so that the brightest field (the "white" field) of the image gray scale is distinguishable, in contrast, from the next brightest field. The video monitor contrast must then be adjusted, by turning the contrast knob, so that the darkest field of the image gray scale (the "black" field) is distinguishable, in contrast, from the next darkest field. Lastly, the apparatus power supply knob must be adjusted so that the reference gray scale fields of the apparatus match with the fields of the image gray scale. Once this adjustment has been made, the arrangement will be set up so that the contrast ranges which appear on the video monitor screen will be the same as that which is exposed on the film camera negative.

Once the above procedure has been performed, the gray scale fields of the image gray scale, which appear on the monitor screen, will match with the corresponding fields of the video monitor reference gray scale of the apparatus. As a result, an observer of the video monitor image, by comparing contrasts of the image and of the reference gray scale of the apparatus of the present invention, will be capable of exercising control over camera exposure in low light level and high light level situations. In this regard, the image which is observed on the video monitor screen, when compared with the reference gray scale of the present invention, will provide an indication of which part, if any, of the photographed image, may be underexposed (thereby requiring more lighting or that the camera lens F stop setting needs to be opened further), or which part, if any, may be overexposed (thereby calling for less light, or that an exposure correction, such as by closing the F stop setting, is necessary).

The setting which is obtained will operate for the particular speed or light (footcandle) level of the film. When using a film having a different speed, a readjustment would have to be performed. Once the above-described procedure has been performed, the image will be an equivalent, in perceived contrast range, to the film camera negative image which is to be photographed and subsequently projected on a movie screen.

The apparatus of the present invention may also be utilized for setting an adjustable contrast filter device. In such an arrangement, the film camera may have an adjustable contrast filter device attached thereto. The adjustable contrast filter device may be adjustable by a control knob, and the adjustable contrast filter device may be typically installed in the filter shaft of the film camera.

The apparatus of the present invention may be utilized to set the adjustable contrast filter device by placing the apparatus, and in particular, the reference gray scale of the apparatus, adjacent to the video monitor screen. In this embodiment, the reference gray scale of the apparatus, the video monitor, and the video assist, must be initially adjusted, with respect to relative contrast range matching, as described hereinabove. Once the reference gray scale of the apparatus has been adjusted, it is to be used as a reference for adjusting the adjustable contrast filter device. The adjustment knob of the adjustable contrast filter device should then be adjusted until the darkest object of the video monitor image matches with either the darkest field of the reference gray scale for film applications (contrast range of 1:128), or the next darkest field, for video and video monitor applications (contrast range of 1:60). Once the above steps have been performed, the contrast ranges of the image will match the contrast range of the film camera negative.

The setting of the adjustable contrast filter device is performed, with reference to the "black" field, as a fraction of the basic footcandle exposure, which is also referred to as flashing or pre-exposure.

In yet another embodiment of the present invention, the apparatus may be constructed integrally with an adjustable contrast range device. Such an embodiment serves to allow for a more precise judgement of eye contrast compression of the adjustable contrast range device which makes the same independent of an adjustable contrast range metering device. In such an embodiment, the apparatus of the present invention is utilized in conjunction with an adjustable contrast range device which device comprises a housing, two halogen light sources, a heat absorbency glass, a light distribution reflector, a light emitter, a shutter and a cover plate. A shutter blade is movable in and out of the light path of the light bulb. The shutter adjusts the light intensity which is internally reflected within the inside of the glass plate, the reflector and the light emitter, which causes a contrast range compression of the image which is photographed through the light emitter.

In a preferred embodiment, the apparatus of the present invention is built into the lower section of the cover plate, so that the reference gray scale is located below the ground edge of the emitter. The reference gray scale comprises a plurality of rectangular openings or fields. One opening or field, which is located at one end of the array, is a dark field ("black" field), while the opening which is located at the other end of the array is a brightly lit field ("white" field). The openings in between are fields which diminish in contrast from dark to light, respectively, so that the fields are arranged from dark ("black") to light ("white") in diminishing order.

In the preferred embodiment, the reference gray scale filters are located behind the rectangular openings or fields of a front portion of the housing. The light, which is supplied by a light source, is internally reflected within the adjustable contrast filter device and in the emitter, is diffused on the ground surface, and is reflected by a mirror through the gray scale filters and fields and to either a camera lens or to a viewer's eye.

In order to adjust the arrangement wherein the apparatus is built into an adjustable contrast filter device, the camera operator must look through the camera viewfinder and identify the blackest object which is illuminated by, or exposed to, the key light of the set which may be either day light, sunlight, or the set lighting. The adjustment knob of the adjustable contrast filter device must then be set until the blackest exposed object matches with either the darkest field of the gray scale, for film applications, or the next darkest field of the gray scale, for video and video monitor applications.

In yet another embodiment of the present invention, the apparatus may be installed within a viewfinder of a camera. In such an embodiment, the apparatus of the present invention is installed in front of a viewfinder ocular. The apparatus, which is built into the viewfinder, comprises a light guide reflector. The reference gray scale of the apparatus is formed within the frame and is located at a lower end of the light guide reflector.

The frame is preferably circular in shape and should have a transparent viewing field which is located symmetrically in the center thereof. The reference gray scale of the apparatus is formed within the frame and is located above the viewing field. The reference gray scale has a plurality of fields which have filters, which range from "black" to "white", in diminishing order respectively, associated therewith.

The viewfinder device is also comprised of a shutter, which is employed to adjust the light level, and a light source, which is located at an end of the light guide reflector opposite the reference gray scale. The apparatus also comprises a light sensor and a voltmeter, which has a calibration scale, which is connected to the light sensor via a suitable line. The viewfinder ocular image is masked by a frame and the reference gray scale of the present invention is located at the top of the masked image.

The present invention, as utilized in this embodiment, may be utilized to adjust a film set arrangement in the following manner. The light source must be adjusted so as to provide the proper light illumination level to the ocular and to the reference gray scale. The light sensor provides an indication of the illumination level which is provided by the light source. The digital voltmeter, which is comprised of the calibration scale, provides readings of voltage signals which are obtained from the light sensor, which readings or voltage signals correspond with the level of light illumination which is supplied to the ocular and the reference gray scale. The required level of light illumination is determined by the speed of the film, which is typically given in ASA numbers, and the camera lens F stop setting. The correspondingly adjusted illumination of the reference gray scale, via the light source, provides a reference contrast range in relation to a film camera negative.

Once the level of light illumination has been adjusted, according to the film speed and F stop setting and, once the illumination of the reference gray scale has been correspondingly adjusted, the operator must look through the viewing field and observe the fields of the reference gray scale so as to compare the contrast range of the photographed image portions. Those portions of the image which are darker than the darkest field of the reference gray scale will be underexposed while those portions which are brighter than the brightest field will be overexposed. Appropriate set lighting adjustments, or camera F stop setting adjustments, must then be made to the film set arrangement until the darkest exposed "black" object matches with either the darkest field of the reference gray scale (for film and/or filming applications) or the next darkest field of the reference gray scale (for video and/or video monitoring applications). Once the above procedure has been performed, the contrast range of the image will correspond to the desired contrast range of the film camera negative.

Further, by reversing the above procedure, the reference gray scale of the present invention may be utilized as a lightmeter in order to determine proper camera lens F stop settings.

Accordingly, it is an object of the present invention to provide a video monitor contrast reference gray scale and method of use thereof, which serves to overcome a lower contrast range of a film camera's video assist (i.e., 1:60) when viewing the photographed image on a video monitor so as to allow for a use of a higher contrast range of film (i.e., 1:128).

It is another object of the present invention to provide a video monitor contrast reference gray scale and method of use thereof, which provides for a visual lighting and exposure control of the photographed image which is particularly of importance when dealing with shadow areas in a filming process.

It is another object of the present invention to provide a video monitor contrast reference gray scale and method of use thereof, which provides for a determination of the contrast range of a film image between the darkest and the brightest of the exposed objects.

It is yet another object of the present invention to provide a video monitor contrast reference gray scale and method of use thereof, which facilitates a setting of a control monitor in accordance with an acceptable contrast range of video equipment.

It is yet another object of the present invention to provide a video monitor contrast reference gray scale and method of use thereof, which provides for a control of set lighting.

It is still another object of the present invention to provide a video monitor reference gray scale, and method of use thereof, which, when utilized in conjunction with adjustable contrast filter equipment or devices, provides for the viewing of a resulting effect on a video monitor which will be the same as that which will be recorded on a film camera negative.

It is another object of the present invention to provide a video monitor reference gray scale, and method of use thereof, which is built into an adjustable contrast filter device in order to provide contrast range adjustability in accordance with film speed and a camera lens F stop setting.

It is yet another object of the present invention to provide a video monitor contrast reference gray scale, and method of use thereof, which, when utilized in conjunction with a camera viewfinder, allows a viewer to view the exact contrast range which can be recorded on a film camera negative.

Other objects and advantages of the present invention will be made apparent to those skilled in the art upon a review of the Description of the Preferred Embodiment taken in conjunction with the Drawings which follow.

BRIEF DESCRIPTION OF THE DRAWINGS

In The Drawings:

FIG. 3 illustrates, in an exploded view, the elements of the elongated light box housing of FIG. 2;

FIG. 13 illustrates yet another alternate embodiment of the apparatus of the present invention which is installed in the front of a viewfinder; and FIG. 14 illustrates a front view of the frame element of the arrangement of FIG. 13.

DESCRIPTION OF THE PREFERRED EMBODIMENT

Figure 1:
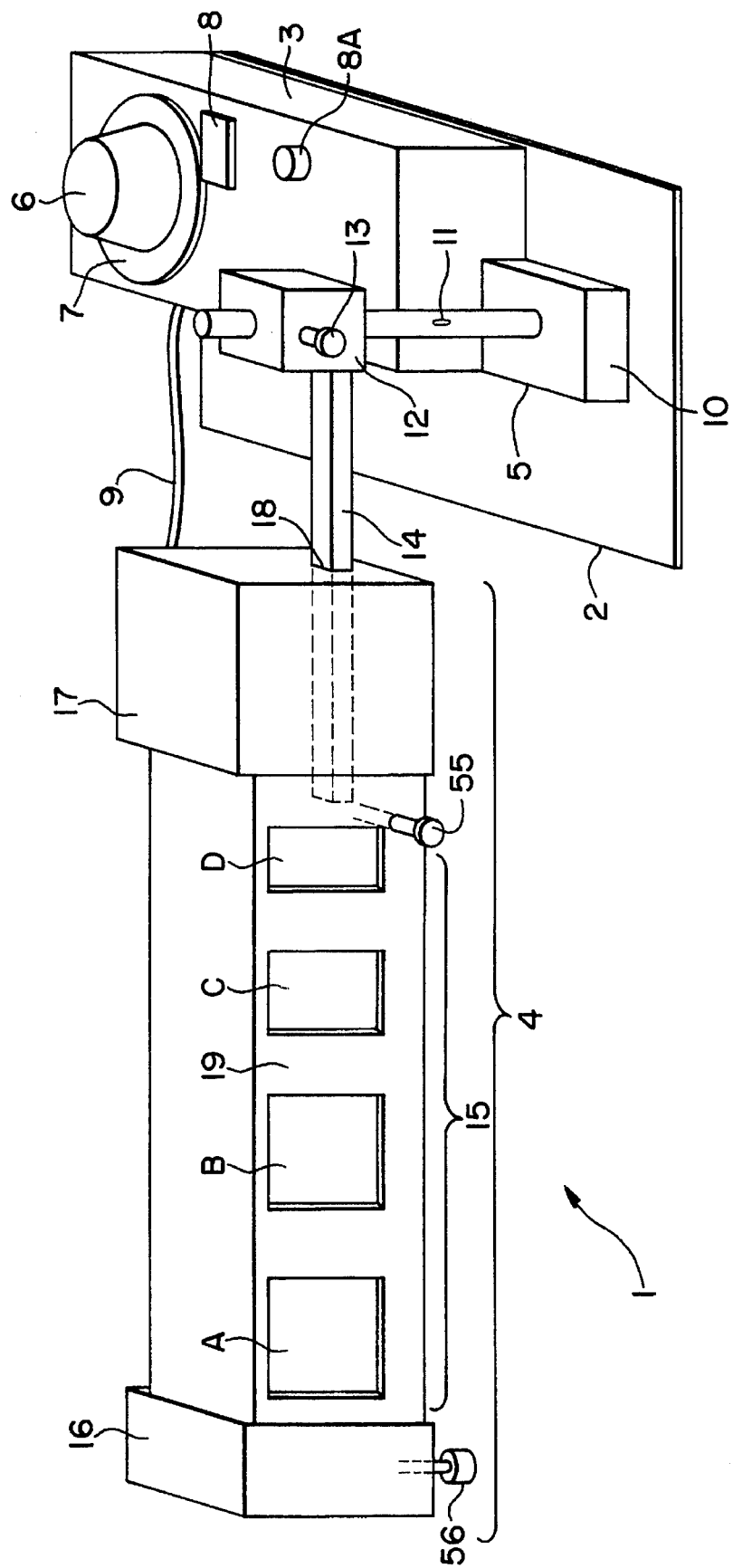
FIG. 1 illustrates the apparatus which is the subject of the present invention.

The apparatus of the present invention, which is a video monitor contrast reference gray scale device, is illustrated in FIG. 1 and is denoted generally by the reference numeral 1. The video monitor contrast reference gray scale device 1 is comprised generally of a base structure 2, a power supply 3, an elongated light box housing 4, and a light box housing support means 5.

In the preferred embodiment, the base structure 2, has located thereon, the power supply 3 and the light box housing support means 5. The power supply 3 provides power to the elongated light box housing 4 via power line 9. The power supply 3 is provided with a knob 6 for adjusting and for varying the output of the power supply 3, a scale 7 for use in conjunction with the knob 6, an on/off switch 8 and a pushbutton switch 8A, which may be utilized to provide sufficient power to power or ignite a fluorescent light bulb (not shown) which is located inside the elongated light box housing 4. The fluorescent light bulb which is utilized in the device 1 will be illustrated and described hereinbelow.

The housing support means 5 comprises a base support 10 which is attached to, and which is located on, the base structure 2. The housing support means 5 also comprises a vertical support post 11, which is connected with the base support 10, a support bracket 12, which is slidably moveable along the vertical post 11 and which may be secured at a desired location, along the vertical post 11, by tightening the bracket locking screw 13. The support bracket has connected thereto, a horizontal post 14, which mates with, or which is connected to, and which extends, at least partially, into the interior of the elongated light box housing 4 thereby allowing the housing 4 to be adjustably positionable horizontally. In this manner, the horizontal post 14, in conjunction with the remainder of housing support means 5, provides support for the elongated light box housing 4, as shown in FIG. 1. In the above manner, the elongated light box housing 4 may be adjustably positioned both vertically and horizontally.

The elongated light box housing 4 is comprised of a housing 19 which has a reference gray scale 15 located on the front side thereof as shown in FIG. 1. The elongated light box housing 4 also has a left end cover 16 and a right end cover 17. The right end cover 17 has an opening 18 on its right side which facilitates an insertion of the horizontal post 14 therein so as to provide a means for connecting and for supporting the elongated light box housing 4 with the housing support means 5. The elongated light box housing 4 may be slid along the horizontal post 14 for horizontal positioning and may be locked in place by tightening adjustment screw 55. The elongated light box housing 4 also comprises a locking screw 56 which is located at the bottom of the left end cover 16, and further provides a means by which to secure the frame relative to the housing 19 of the light box housing 4, the elements and features of which will be described in more detail hereinbelow.

The reference gray scale 15 has transparent rectangular fields A, B, C and D which are arranged in diminishing size, from left to right, respectively, as shown in FIG. 1. While, in the preferred embodiment, the reference gray scale 15 has four fields, it is important to note that the reference gray scale 15 may have any desired number of fields, of a rectangular or any other suitable shape, which may be dictated by the application.

Figure 2:
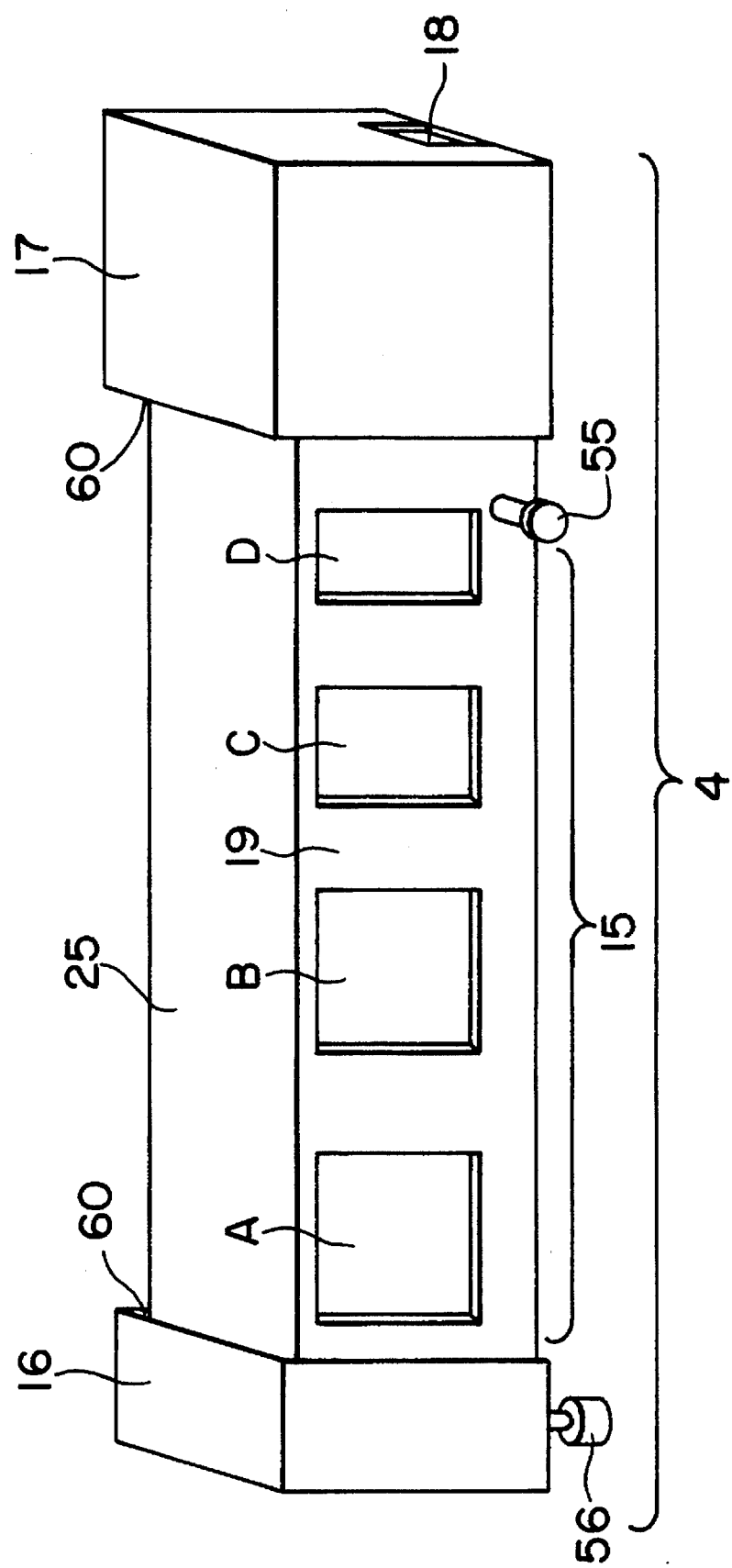
FIG. 2 illustrates the elongated light box housing which is utilized in the apparatus of FIG. 1.

FIG. 2 illustrates the elongated light box housing 4. FIG. 3 illustrates, in an exploded view, the components of the elongated light box housing 4. With reference to FIG. 3, the light box housing 4 is described as follows. The light box housing 4 is comprised of a housing 19 and a frame 20. The light box housing 4 is also comprised of a left end cover 16 and a right end cover 17.

With further reference to FIG. 3, the housing 19, has on its front side, cutouts, or fields A1, B1, C1 and D1, which range in diminishing size, from left to right, respectively, as shown in FIG. 3. While the housing 19 has a top side shown as reference numeral 25 in FIG. 2, such is not shown in FIG. 3.

Located inside the housing 19 is an elongated fluorescent light bulb 22, which is mounted in a socket 23 which socket is located adjacent to the right end cover 17 of the housing 19 as shown in FIG. 3. The socket 23 is connected to the supply line 9 of the power supply 3 via the rear of light box housing 4, as shown in FIG. 1. Electrical power is supplied to the socket 23 from the power supply 3, via supply line 9, so as to provide power to the fluorescent light bulb 22 which is mounted therein. As shown in FIG. 3, in the preferred embodiment, the fluorescent light bulb 22 extends from the socket 23 to a location approximately in the vicinity of the field C1. Referring once again to FIG. 3, the right end cover 17 of the light box housing 4 is connected to the right side of the housing 19. The socket 23 is housed within, or adjacent to, the right end cover 17.

With continued reference to FIG. 3, the light box housing 4 is also comprised of a frame 20. FIG. 3 illustrates the frame 20 which is shown as having a front side 30 and an end side 24. The frame 20 is open at its top and right sides as shown in FIG. 3. The front side 30 of the frame 20 has rectangular fields A1', B1', C1' and D1', which correspond in size and shape to the fields A1, B1, C1 and D1 of the housing 19, respectively. Located between the B1 and C1 fields, on the interior side of the frame 20, is a mask structure 135 which protrudes from the inner wall of the frame 20 as shown in FIG. 3. The mask structure 135 serves to partially shade fields A1' and B1' and therefore, the fields A and B of the reference gray scale 15 of FIG. 1, from direct illumination by the fluorescent light bulb 22.

Located adjacent to each of the fields A1', B1', C1' and D1' of the frame 20, on the inner side thereof, are pocket-like supports 34 which have grooves 35 therein. Each of the supports 34 facilitates the insertion, and retention therein, of light filters 40, 41, 42, and 43 in each of the fields A1', B1', C1' and D1', respectively. In the preferred embodiment, the filters 40 to 43 are neutral density (N.D.) filters. The filters 40, 41, 42 and 43 may be easily insertable and removable from the supports 34 and may be changed depending upon the desired application.

The left end cover 16 is connected to the end side 24 of the frame 20. The right end cover 17 is connected to the right end of the housing 19, adjacent to the socket 23. End covers 16 and 17 are chosen so that their top portions extend beyond the top of the frame 20 and housing 19, respectively, so as to provide openings 60 as shown in FIG. 2, at the top of the elongated light box housing 4. The openings 60 provide ventilation spaces for an air flow cooling of the interior of the housing 19 and of the fluorescent light bulb 22 which is located therein.

The frame 20 is slid into the housing 19 and is slidably movable therein so that the fields A1', B1', C1' and D1' of the frame 20, are positionable in relation to the fields A1, B1, C1 and D1, respectively, of the housing 19. The frame 20 may be secured relative to, and to, the housing 19 by tightening the locking screw 56. The frame 20 is slidably controllable by means of the left end cover 16 which is attached thereto via locking screw 56. The slidability of the frame 20, with respect to the housing 19, facilitates an easy changing of the filters 40, 41, 42, and 43.

Figure 4A:
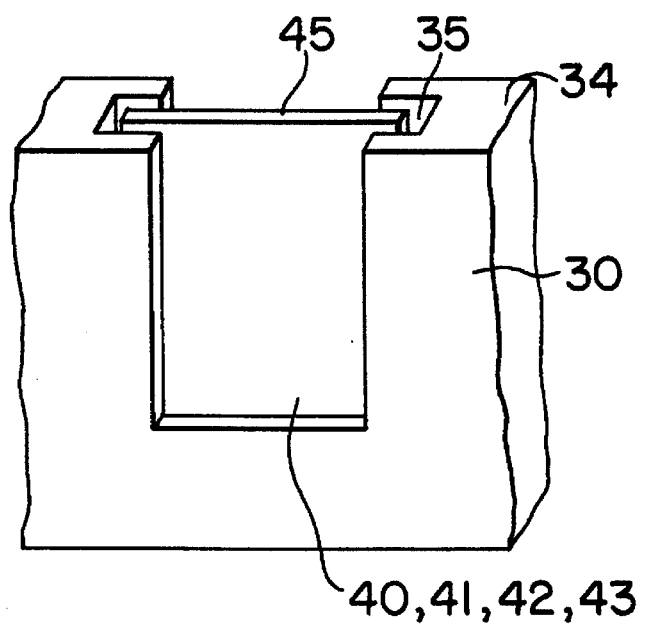
FIG. 4A illustrates a magnified view of a portion of the front side of the frame element of the elongated light box housing of FIG. 3.
Figure 4B:
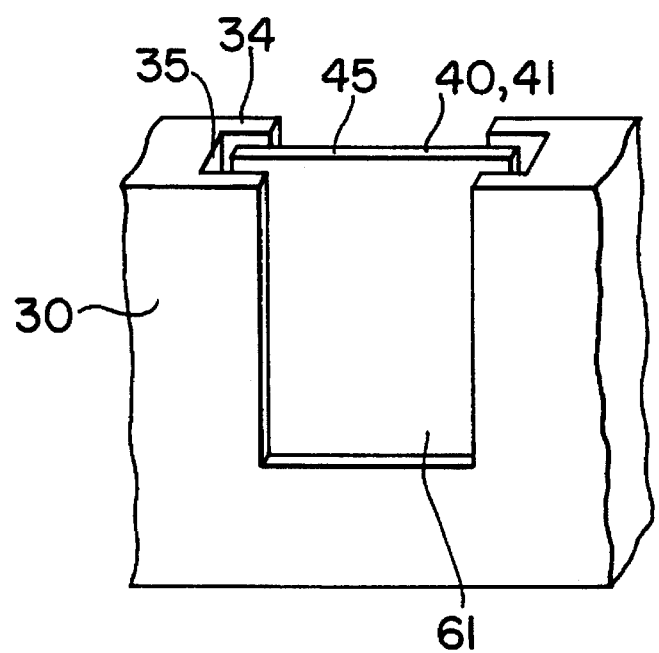
FIG. 4B illustrates the magnified view of the portion of the front side of the frame element of the elongated light box housing of FIG. 4A with a matte surface utilized therewith.

FIG. 4A illustrates a magnified view of a portion of the front side 30 of frame 20, showing one of the filters 40 to 43 inserted within the pocket-like supports 34 of the respective field of the frame 20. As shown in FIG. 4A, each filter, which may be any one of filters 40, 41, 42 or 43, has a diffusion foil 45 located on the rear side thereof. In the preferred embodiment, the filters 40 and 41 are also provided with a matte surface 61 as shown in FIG. 4B.

Referring once again to FIG. 3, the field A1' is the darkest and the largest field which is located on the frame 20. The field D1' is the brightest and the smallest field which is located on the frame 20. The fields B1' and C1' have a gradual increase in brightness and an associated decrease in size in the direction from field A1' to field D1'. The filters 40, 41, 42 and 43 which are placed in the fields A1', B1', C1' and D1', respectively, may be easily changed and exchanged with other fields. The filters 40, 41, 42 and 43 may have different contrasts and/or ranges of contrasts relative to one another, so as to establish a desired contrast range between the fields A1' and D1' (i.e., 1:128 for film applications and 1:60 for video and video monitoring applications). In addition, since video monitor screen color temperatures may vary from monitor to monitor, or among different monitors, which may require matching with a reference gray scale, the filters 40, 41, 42 and 43 may be balanced with color filters.

Once the frame 20 is positioned within the housing 19 so that the fields A1', B1', C1' and D1' of the frame 20, and their associated filters 40, 41, 42 and 43, respectively, are in a desired alignment, or position, relative to the fields A1, B1, C1 and D1 of the housing 19, the frame 20 and the housing 19 are secured in relation to one another by tightening the locking screw 56. Once the above positioning has occurred, the reference gray scale 15 of the elongated light box housing 4 is established as shown in FIGS. 1 and 2.

The housing 19 provides illumination from behind the filters 40, 41, 42 and 43, via the fluorescent light bulb 22. With the fluorescent light bulb 22 illuminated, the elongated light box housing 4, in conjunction with the respective fields of the housing 19, the frame 20, and the filters 40, 41, 42 and 43, provide a reference gray transparent scale or reference gray scale 15 which has four contrast shades. The contrast shades range in contrast from black to white, or from a highest (darkest) contrast to a lowest (brightest) contrast. The reference gray scale 15, which results, is utilized in order to perform contrast adjustments to motion picture filming equipment in a manner which will be described below.

In the preferred embodiment, the housing 19 is painted white on its interior and, typically, provides a reflected light filter illumination which has a color temperature of 6000° K., the temperature of which, in general, matches the color temperature of a video monitor screen.

Referring once again to FIG. 1, a light intensity adjustment to the illumination of the fields A, B, C and D of reference gray scale 15 is facilitated by adjusting the power supply 3, with the level or intensity of the illumination controlled by the adjustment knob 6, which may or may not be utilized in conjunction with the scale 7 and/or by an activation of the on/off switch 8 and/or the pushbutton switch 8A.

Figure 5:
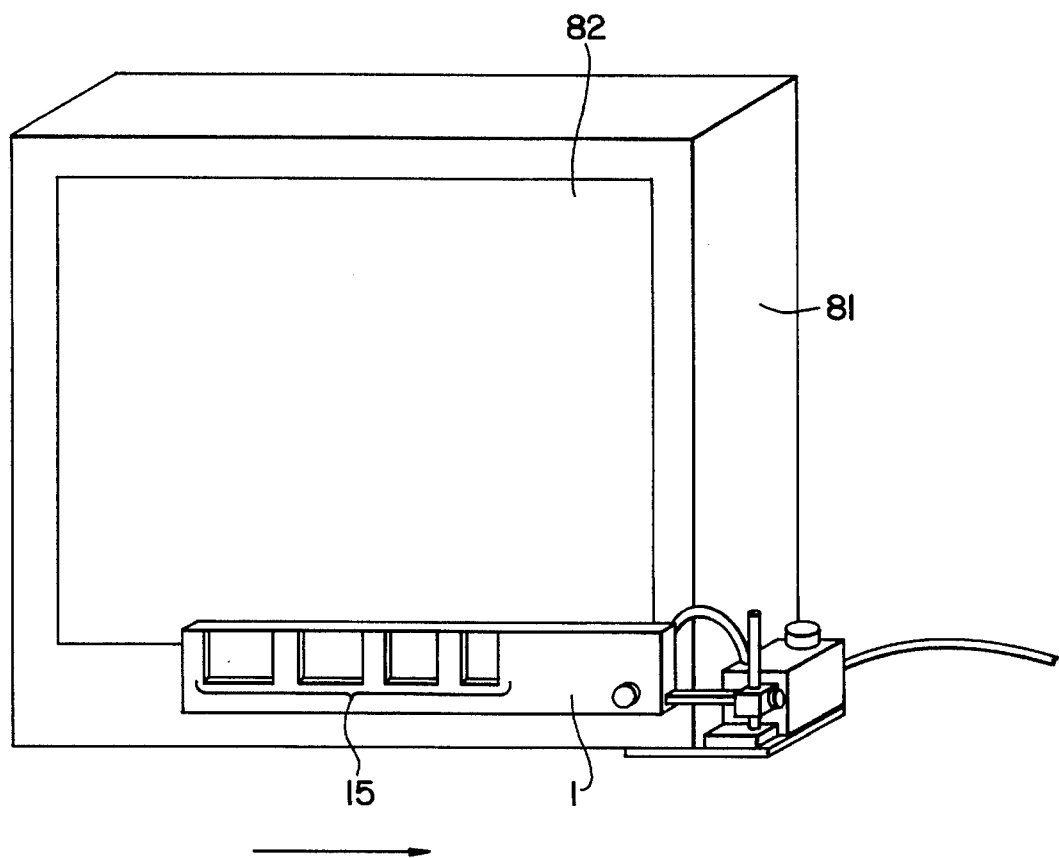
FIG. 5 illustrates the apparatus which is the subject of the present invention as it is utilized adjacent to a video monitor.

FIG. 5 illustrates a typical arrangement wherein the apparatus 1 of the present invention is placed adjacent to a video monitor screen 82 of a video monitor 81. The apparatus 1 of the present invention may be utilized and be set up in accordance with a contrast range of a film camera negative.

Figure 6:
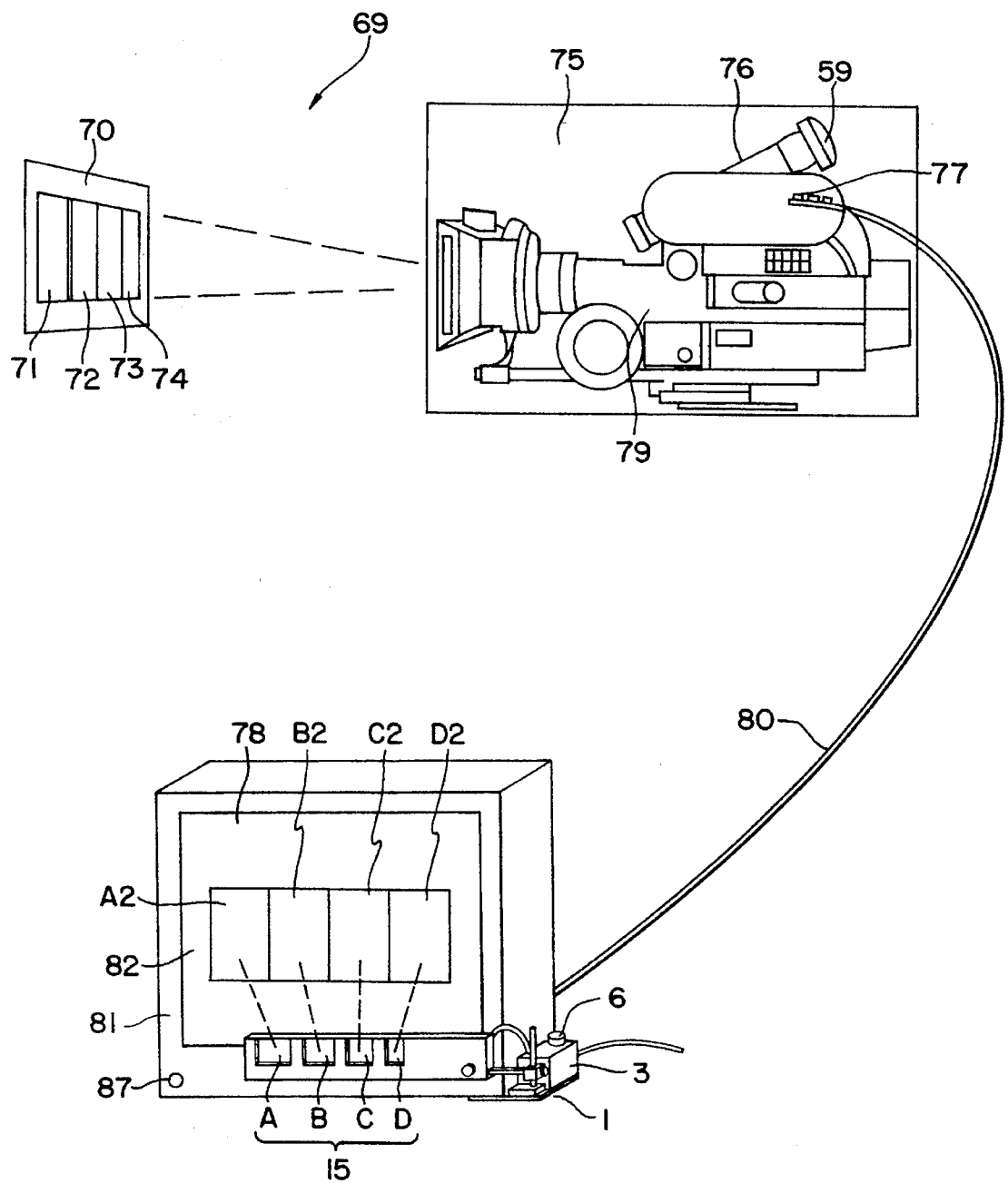
FIG. 6 illustrates a typical arrangement wherein the apparatus of the present invention is utilized in order to set a video monitor image of a gray scale chart according to the contrast range of a film camera negative.

FIG. 6 illustrates an arrangement, wherein the apparatus 1 of the present invention is utilized in order to adjust or set-up a video monitor image of a gray scale according to the contrast range of a film camera negative. Such an adjustment or set-up provides that the contrast range of the image, which is viewed on a video monitor during motion picture filming, will match as closely as possible in contrast, with the contrast range of a film camera negative so as to ensure optimum contrast ranging and observation in motion picture filming.

With reference to FIG. 6, the arrangement includes a camera gray scale 70, which is a reflective light gray scale, which is illuminated with the motion picture set's key light 69. A motion picture set key light is the exposure light level, typically measured in footcandles, which is determined by the film negative manufacturer in order to expose a chart which has a contrast range of 1:128 (black to white) so that the image thereof is placed on the straight portion of a sensitometric negative gamma curve. It is noted that a sensitometric negative gamma curve defines, in a laboratory processing procedure, the control which is exercised over the development process and the further controls over the exposure and the contrast range of the exposed film camera negative. The gray scale 70 has four contrast fields 71, 72, 73, 74 which range from black (darkest) to white (brightest) in a diminishing order, respectively.

FIG. 6 also illustrates a film camera 75 which has a camera video assist 76 which is utilized in conjunction therewith. The camera 75 has a viewfinder 59 attached thereto. The camera video assist 76 has a gain control setting or video assist adjustable diaframe control knob 77. The film camera 75 also has an F stop setting diaframe 79 which is set for the key light 69 of the motion picture set. The camera video assist 76 is connected so as to receive a portion of the light path of the viewfinder 59.

The video assist camera 76 is connected, via wiring 80, to a video monitor 81. It is important to note that the video assist camera may also be linked to a video monitor via a suitable wireless transmission system. The video monitor 81 has a video monitor screen 82 and a video monitor contrast adjustment knob 87. The apparatus 1 of the present invention is placed adjacent to the video monitor 81, and in particular, adjacent to the video monitor screen 82, as shown in FIG. 6. The reference gray scale 15 of the apparatus 1 is located adjacent to the video monitor screen 82, as shown at the bottom of the screen. FIG. 6 also illustrates the knob 6 of the power supply 3 of the present invention. The gray fields A, B, C and D of the reference gray scale 15 are also illustrated in FIG. 6.

With the gray scale 70 illuminated by the key light 69, and with the film camera 75 set up to view the gray scale 70, an image gray scale 78, which is the image of the gray scale 70, will appear on the video monitor screen 82 as shown in FIG. 6. The contrast adjustment of the video monitor 81 is also typically set to a medium level. The image gray scale 78, which appears on the video monitor screen 82, has contrast fields A2, B2, C2 and D2 as shown in FIG. 6.

In order to adjust the key light 69 which illuminates the gray scale 70, in accordance with the film speed, which is dictated by the camera lens F stop setting, and further, so that the image gray scale 78 will appear on the video monitor screen 82 and provide corresponding contrast ranges or "readings" in accordance with the gray scale chart 70, the following adjustment steps have to be made to the equipment of FIG. 6.

The video assist gain knob 77 of the camera video assist 76 must be adjusted so that the brightest field ("white" field) D2 of the image gray scale 78, which appears on the video monitor screen 82, is distinguishable, in contrast, from the next brightest field C2. In addition, the video monitor contrast must then be adjusted, via the video monitor contrast knob 87, so that, and until, the darkest field ("black" field) A2 is clearly distinguishable, in contrast, from the next adjacent darkest field B2. In this regard, field A2 should be dark, but should have visible surface details. The apparatus power supply 3 must then be adjusted via the knob 6 so that the fields A, B, C and D of the reference gray scale 15 match, in contrast, with the fields A2, B2, C2 and D2 of the image gray scale 78.

Once the above adjustment has been made, the fields A2, B2, C2 and D2, of the image gray scale 78, which appear and which remain on the monitor screen 82, will match with the corresponding fields 71, 72, 73 and 74, respectively, of the gray scale 70. Once the above process has been performed, a user or operator of the video assist equipment will have control over camera exposure in "blacks" (low light levels) and in "whites" (high light levels) and may adjust set lighting accordingly. In this regard, the image gray scale 78, which is observed on the monitor screen 82 indicates which portion of the image gray scale 78, and a photographed image, may be underexposed (i.e., needs more light, or that the lens F stop setting needs to be opened) or which portion of the image may be overexposed (i.e., needs less light, or that the lens F stop setting needs to be closed).

While such a control during a filming process may be performed in conjunction with a lightmeter, it is important to note that not all pertinent parameters may be measured by a lightmeter, and further, that some image areas, due to a reflection of less light or of too much light, may easily fall outside of the control range of a lightmeter. Further, it is also important to note that the compensation of the contrast range for a film contrast range ratio of 1:128 may not always be selected properly with a lightmeter as the contrast range of the human eye may reach levels of as high as 1:10,000.

While, in the preferred embodiment, the fields A, B, C and D of the reference gray scale 15 of the apparatus 1, are described as being selected and/or set for a contrast range of 1:128, particular video monitor contrast range requirements may be met by utilizing different or lower contrast range filters 40 to 43 in the apparatus 1.

Once the above-described steps have been performed and the film camera 75, through the camera video assist 76, is aligned, in contrast, with the video monitor screen 82, the video monitor screen 82 will provide an indication of what is actually being photographed and/or exposed on the film camera negative. The above described adjustment procedure is valid for a given particular speed or light intensity level for the film which is utilized. When employing a film which has a different speed, a readjustment of the arrangement must be performed. In this manner, the motion picture lighting process may be controlled by watching the image gray scale 78, of the gray scale 70, on the video monitor screen 82. When properly adjusted, the images in the contrast range, which are displayed on the video monitor screen 82, are equivalent, in perceived contrast range, to the film image which will be photographed and later projected onto the movie screen.

The above-described setting routine and use of the apparatus 1 may be utilized for any F stop setting of a camera. In this regard, the F stops, which are set on the camera lens, will correspond with what will be exposed on film. Further, it is also important to note that, if there are no details which are discernable in the shadow areas on the image of the video monitor screen 82, then no details in the shadow areas will be photographed and/or exposed on the film camera negative.

By adjusting the F stop 79 of the lens of the film camera 75, the image gray scale 78 will change from an overexposure to an underexposure or vice versa. In this manner, it is possible to determine where a correct exposure lies. It is also important to note that the process of setting the F stop, even if this is performed by the human eye, once the video camera 75 is aligned, is accurate to a range of ⅓ of an F stop.

Figure 7:
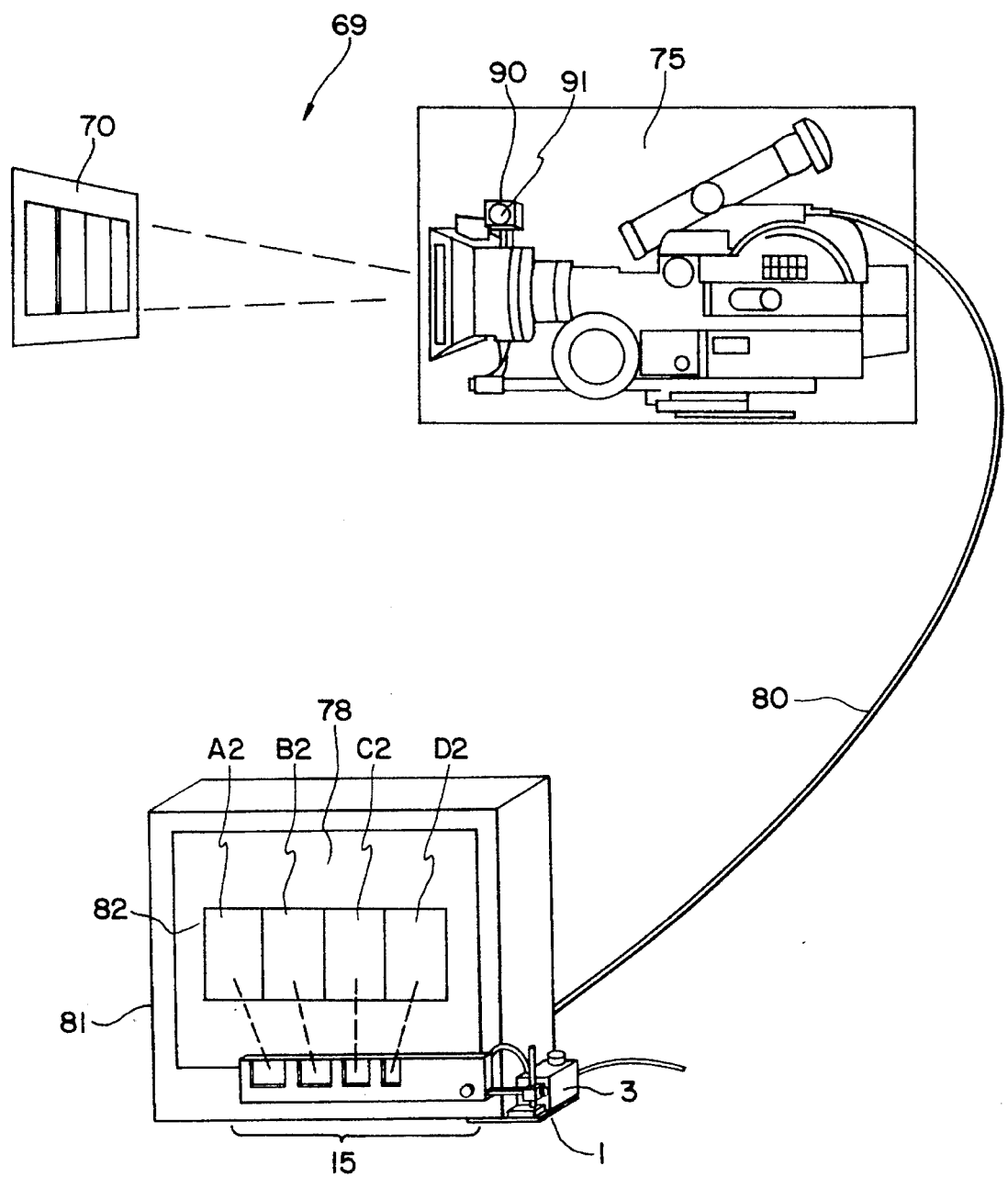
FIG. 7 illustrates a typical arrangement wherein an alternate embodiment of the apparatus of the present invention is utilized for setting an adjustable contrast range device.

The apparatus 1 of the present invention may also be utilized for setting an adjustable contrast range device, such as a Varicon® adjustable contrast filter, which is the subject of U.S. Pat. No. 4,900,131, which is assigned to the assignee of the present application and the subject matter of which is hereby incorporated by reference herein. FIG. 7 illustrates a system arrangement wherein an alternate embodiment of the apparatus 1 may be utilized for setting an adjustable contrast range device, (i.e., the Varicon®).

The arrangement of the system of FIG. 7 comprises essentially the same components as the system of FIG. 6 with the only difference being that the film camera 75 in FIG. 7 has an adjustable contrast range device or Varicon® device 90 attached thereto, in front of the camera lens. The adjustable contrast range device 90 is adjustable by a control knob 91 as shown. The adjustable contrast range device 90 is typically installed in the filter shaft of the film camera 75.

The adjustable contrast range device 90 provides for an adjustable contrast range for a photographed image with the adjustability being controlled by the control knob 91. The reference gray scale 15 of the apparatus 1 must be adjusted in accordance with the contrast range of the film camera negative, as described above, independently of the adjustable contrast filter device 90. Once the above adjustment has been performed, the control knob 91 of the adjustable contrast filter device 90 must be adjusted until the darkest object of the image matches, in contrast, with the field A2 (in the case of film and/or filming applications), or the field B2 (in the case of video and/or video monitoring applications) of the reference gray scale 15. In order to adjust the contrast of the image gray scale 78, the control knob 91 of the adjustable contrast range device 90 is adjusted so as to cause a shifting of the darkest "black" field A2 of the image gray scale 78, in the direction of the next brighter field B2 of the image gray scale 78. Since the basic application of the Varicon® adjustable contrast range device is to affect only fields A2 and B2 of the image gray scale 78, the fields C2 and D2 will not be effected.

Figure 8:
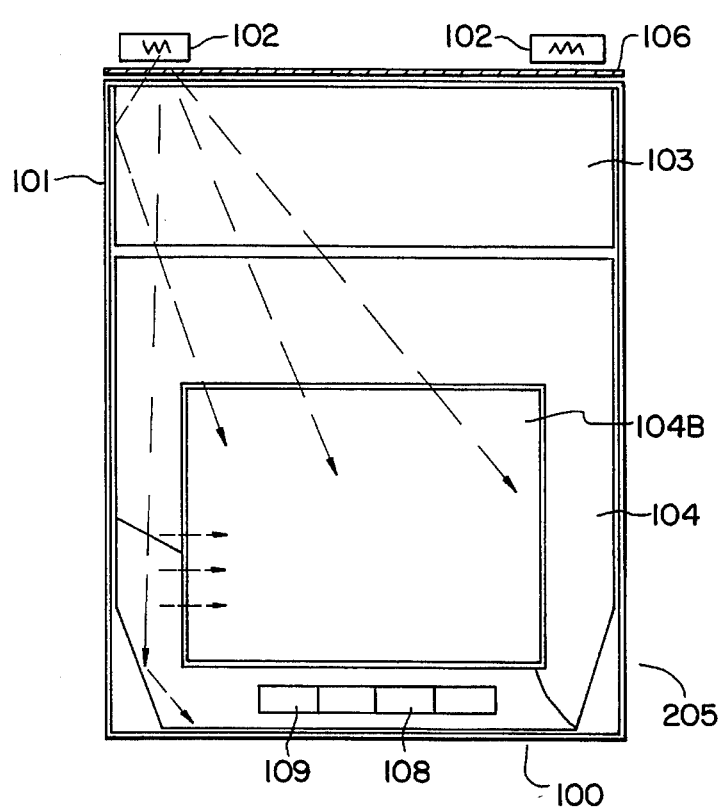
FIG. 8 illustrates an adjustable contrast range device.

In another embodiment of the present invention, the apparatus may be constructed integrally with an adjustable contrast range device or the Varicon® device 90 of FIG. 7. The embodiment of FIG. 7 provides for an independent judgement of human eye contrast compression which, is independent of any adjustable contrast range metering device and which is further independent of the video assist camera image. FIG. 8 illustrates an alternate embodiment of the apparatus of the present invention which is denoted generally by the reference numeral 205. The apparatus 205 is installed in an adjustable contrast range device which is typically the Varicon® device which is denoted generally by the reference numeral 100. The device 100 comprises a housing 101, two halogen light sources 102, a heat absorbency glass 103, a light distribution reflector 104 and a light emitter 104B. The device 100 further comprises a shutter blade 106 and a cover plate 109. The reference gray scale 108 of the apparatus 205 is located at, or on, the lower portion of the cover plate 109 as shown.

Figure 9:
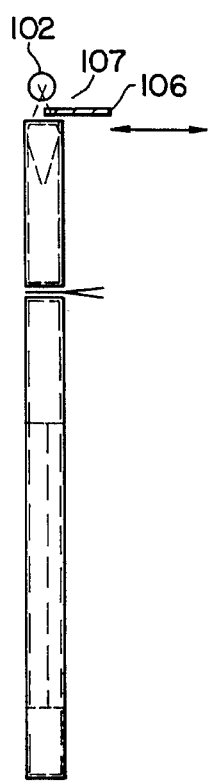
FIG. 9 illustrates a side view of the adjustable contrast range device of FIG. 8.

FIG. 9 illustrates a side view of the device 100 of FIG. 8. FIG. 9 more clearly illustrates the shutter blade 106. As can be seen in FIG. 9, the shutter blade 106 is movable in and out of the light path of the light emitted from the light bulb 102. The shutter blade 106 adjusts the light intensity of the light which is internally reflected within and inside the glass plate 103, the reflector 104, and the light emitter 104B, which elements cause a contrast range compression of an image which is photographed through the light emitter 104B.

Figure 10:
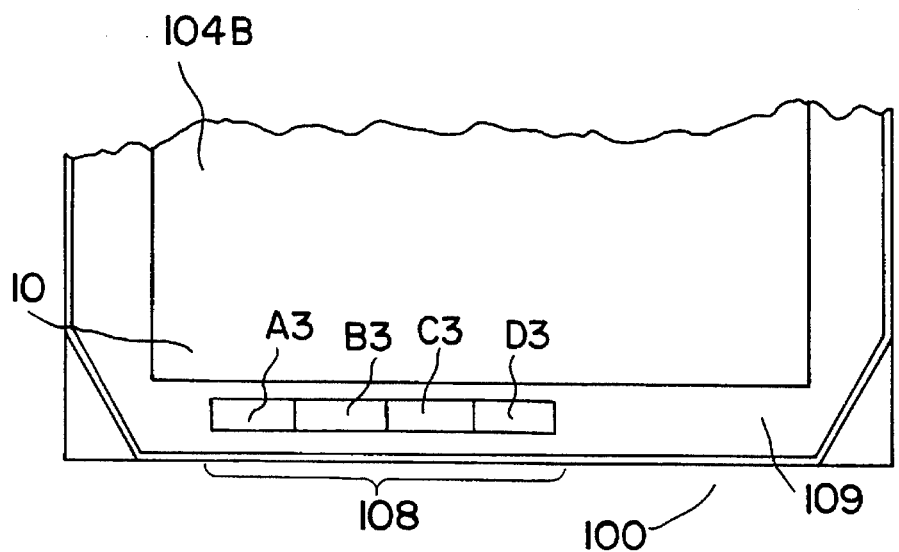
FIG. 10 illustrates a portion of the adjustable contrast range device of FIG. 8 illustrating an alternate embodiment of the apparatus of the present invention which is installed in the adjustable contrast range device.

FIG. 10 illustrates the lower portion of the device 100 of FIG. 8 which has the apparatus 205 and the reference gray scale 108 which is built integrally therein. In the preferred embodiment, the reference gray scale 108 is built into the lower section of the cover plate 109. The reference gray scale 108 is located below the ground edge 110 of the emitter 104B.

Figure 11:
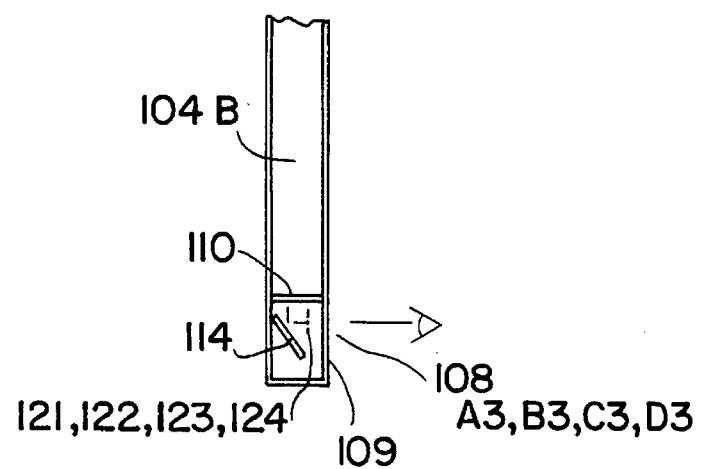
FIG. 11 illustrates a side view of the portion of the adjustable contrast range device of FIG. 10.

The reference gray scale 108 comprises four rectangular openings or fields A3, B3, C3 and D3 which are arranged from left to right, respectively. Openings or fields A3, B3, C3 and D3 have associated therewith filters 121, 122, 123 and 124, respectively, which are located within the device 100 and which are shown collectively in FIG. 11. FIG. 11 illustrates a side view of the portion of the device 100 which is illustrated in FIG. 10. The filters 121, 122, 123 and 124, which are collectively illustrated in FIG. 11, range in contrast from black to white, respectively. As a result, opening or field A3 is a dark ("black") field, opening or field D3 is a brightly lit ("white") field, and openings or fields B3 and C3 are fields which diminish, in contrast, from darkest to brightest, respectively, so that the fields A3 to D3 are arranged from darkest ("black") to brightest ("white") in diminishing order.

FIG. 11 further illustrates the cover plate 109 and the rectangular openings or fields A3, B3, C3 and D3 of the reference gray scale 108 of the apparatus 205 which are formed in the cover plate 109. FIG. 11 also illustrates the ground edge 110 of the emitter 104B. In the preferred embodiment, the reference gray scale filters 121, 122, 123 and 124 are neutral density filters and are located behind the rectangular openings or fields A3, B3, C3 and D3 of the reference gray scale 108. In the arrangement of FIGS. 10 and 11, the light, which is supplied by the light sources 102 is internally reflected, as shown in FIGS. 8, 9 and 11, within the device 100 and in the emitter 104B, is diffused on the ground edge 110 and is reflected by the mirror 114, through the reference gray scale filters 121, 122, 123 and 124 and fields A3, B3, C3 and D3 and either to a camera lens or to a viewer's eye, whichever the case may be, as shown.

Figure 12A:
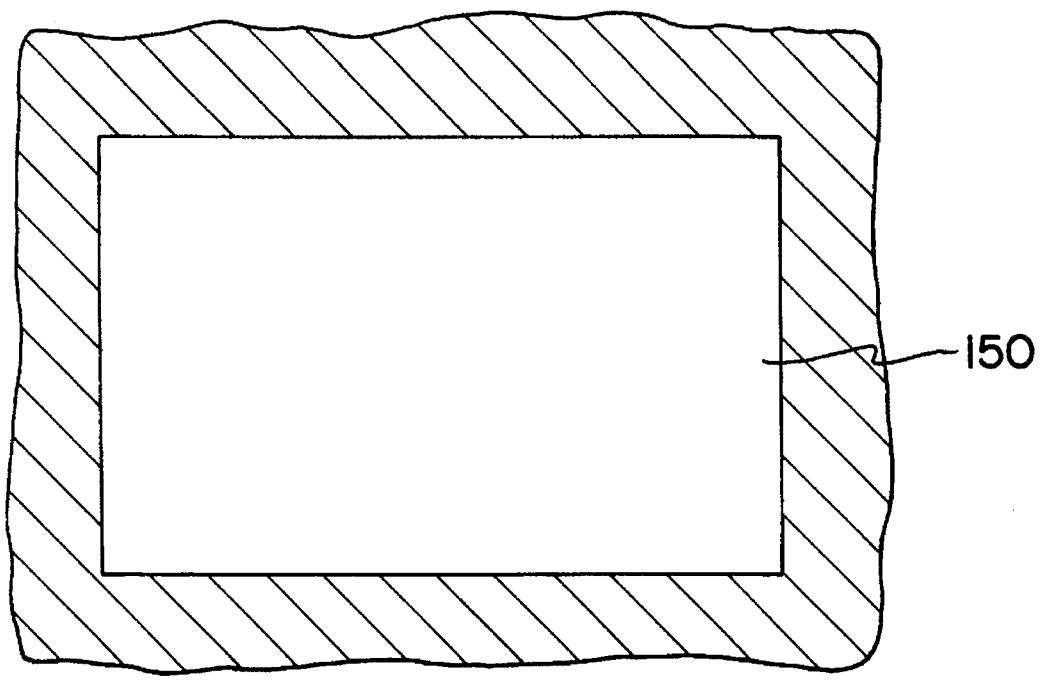
FIG. 12A illustrates a view, through a typical camera viewfinder, of an arrangement which utilizes an adjustable contrast range device installed therein.
Figure 12B:
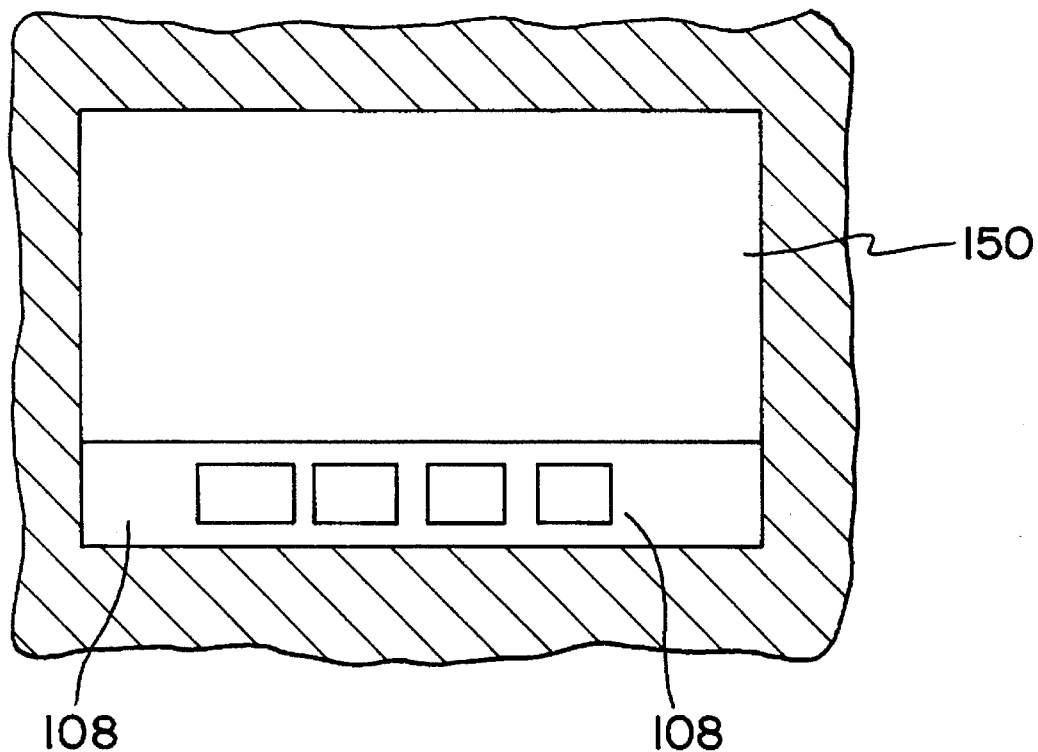
FIG. 12B illustrates a view, through the typical camera viewfinder of the device of FIG. 12A, illustrating a built-in apparatus of the present invention installed therein and ready for use.

In this manner, the embodiment of FIGS. 8 to 11 provides for an apparatus 205 which has a reference gray scale 108 which is illuminated by a light source 102 from the adjustable contrast range device 100. FIG. 12A illustrates a view, through a typical camera viewfinder, of an arrangement having an adjustable contrast range device installed therein. FIG. 12A illustrates a view, through a typical camera viewfinder 150, of the device 100 which does not contain the apparatus 205 and the reference gray scale 108 of the present invention. As can be seen from FIG. 12A, when the apparatus 205 and the reference gray scale 108 are not utilized, no reference gray scale 108 is visible in the viewfinder 150. When the apparatus 205 and the reference gray scale 108 are utilized, in conjunction with the device 100, such as by pulling or displacing the device 100 partially out of the camera's filter shaft (not shown), the reference gray scale 108 will appear and become visible at the bottom of the viewfinder 150 as illustrated in FIG. 12B.

The apparatus of the present invention, as illustrated in FIGS. 8 to 11, can be utilized in order to adjust the adjustable contrast range device 100 in accordance with a film camera negative, in the following manner. The operator must look into the viewing field 150 and find the darkest black object which is exposed by either a key light, set or tungsten lighting, or day light. The control knob 91 of the adjustable contrast range device 100 must then be adjusted with reference to the darkest "black" exposed object in the viewing field until the darkest exposed object matches, in contrast, with either the A3 field of the reference gray scale 108 (for film and/or filming applications) or the B3 field of the reference gray scale 108 (for video and/or video monitoring applications).

It should be noted that the brightness of the reference gray scale 108 changes in accordance with the intensity level of the light which is internally reflected in the emitter 104B of the device 100. Once properly adjusted, the contrast range of the reference gray scale 108 will match the contrast range which is exposed on a film camera negative.

In yet another alternate embodiment of the present invention, the apparatus is installed within a viewfinder of a film camera. FIG. 13 illustrates an alternate embodiment of the apparatus which is generally denoted by reference numeral 305. In FIG. 13, the reference gray scale 250 of the apparatus 305 is comprised of fields A5, B5, C5 and D5. The apparatus 305 is installed in the front of a viewfinder.

With reference to FIG. 13, the ocular of the viewfinder is denoted generally by the reference numeral 300 and the ocular optic is denoted by reference numeral 301. The ocular focal distance $f_0$, which is typically located behind the rear ocular lens, is designated by reference numeral 302. The reference gray scale 250, which is built into the viewfinder, and in particular, into the ocular 300 as shown, comprises a light guide reflector 303, which is an L-shaped reflector which has a 45° wedge 304 as shown. It is important to note that the reference gray scale 250 may be built into any other appropriate component or part of a viewfinder provided that it is in a suitable location for proper use. It is also important to note that the reference gray scale 250 may be built into any other suitable component of or located in any appropriate location in a viewfinder. Located at the lower end of the reflector 303 is the reference gray scale 250 of the apparatus 305, which is formed within the frame 306.

FIG. 14 illustrates a front view of the frame 306. As illustrated in FIG. 14, the frame 306 is circular in shape and has a rectangular viewing field 307, which is masked by the frame 306, which is located symmetrically in the center thereof. The reference gray scale 250 of the apparatus 305 is formed within the frame 306 and is located above the viewing field 307 as shown. The reference gray scale 250 is illustrated as having four fields A5, B5, C5 and D5, which fields contain filters 360, 361, 362 and 363 (shown in FIG. 13), respectively, which may be neutral density filters which range from "black" to "white", respectively. The intermediate fields B5 and C5 have a diminishing contrast from "black" to "white" from left to right, respectively. The contrast range values of the fields A5 to D5 of the reference gray scale 250 is 1:128. As can be seen from FIGS. 13 and 14, the reference gray scale fields A5 to D5 are rectangular in shape.

Referring once again to FIG. 13, the ocular 300 is also comprised of a shutter 308 which is employed to adjust the light level. The ocular 300 is also comprised of a light source 309, which is a halogen light source. The light source 309 is placed at the end of the light guide reflector 303 which is opposite the end where the reference gray scale 250 is located. The apparatus 305 also comprises a light sensor 310. The arrangement of FIG. 13 also comprises a digital voltmeter 311, which has a calibration scale 312 associated therewith, and which is utilized in conjunction with the apparatus 305. The calibration scale 312 provides scales and/or reference tables which indicate voltage settings which are required for various film speeds and/or camera lens F stop settings. The voltmeter 311 is connected to the light sensor 310 via line 313 so as to measure voltage readings obtained from the light sensor 310.

The present invention, as used in this embodiment, may be utilized to adjust a film arrangement in the following manner. The light source must be adjusted so as to provide the proper light illumination level to the viewfinder ocular 300, and correspondingly, to the reference gray scale 250. The light sensor 310 provides an indication of the illumination level provided by the light source 309. The digital voltmeter 311, which is also comprised of the calibration scale 312, provides readings of voltage signals which are obtained from the light sensor 310, which readings or voltage signals correspond with the level of light illumination which is provided to the viewfinder ocular 300 and, correspondingly, to the reference gray scale 250. The required level of light illumination is determined by and is a function of the speed of the film, which is typically given in ASA numbers, and the camera lens F stop setting. The correspondingly adjusted illumination of the reference gray scale 250, via the light source 309, provides a reference contrast range in relation to a photographed image and/or to a film camera negative.

Once the level of illumination has been set, according to the film speed and the camera lens F stop setting, with the level of illumination verified by the voltmeter 311, and once the illumination of the reference gray scale 250 has been correspondingly adjusted, the operator must then look through the viewing field 307 and observe the fields A5 to D5 of the reference gray scale 250 as a means for comparing the contrast range of the photographed image portions. Those portions of the image which are darker than the darkest field of the reference gray scale 250 will be underexposed while those portions which are brighter than the brightest field will be overexposed. Appropriate light adjustments, and/or F stop setting adjustments, must then be made to the filming arrangement until the darkest exposed "black" object matches with either the darkest field A5 of the reference gray scale 250 (for film and/or filming applications) or the next darkest field B5 of the reference gray scale 250 (for video and/or video monitoring applications). Once the above procedure has been performed, the contrast range of the image will correspond to the desired contrast range of the film camera negative.

It is also important to note that, the above procedure may also be reversed so that the apparatus 305 may be utilized as a lightmeter so as to determine a proper camera lens F stop setting.

While the present invention has been described and illustrated in various preferred embodiments, such descriptions and illustrations are merely illustrative of the present invention and are not to be construed to be limitations thereof. Accordingly, the present invention is meant to encompass all modifications, variations and/or alternate embodiments with the scope of the present invention limited only by the claims which follow.

What is claimed is:

1. A video monitor contrast reference gray scale apparatus, comprising:

a reference gray scale housing;

a reference gray scale which comprises a plurality of fields which provide a contrast range on said reference gray scale;

a light source which is located inside said reference gray scale housing and which provides illumination to said reference gray scale; and a power supply for providing power to said light source;

wherein said reference gray scale is located in said reference gray scale housing, and further wherein said power supply provides power to said light source so as to provide illumination of said reference gray scale, wherein said apparatus further comprises:
a reference gray scale housing support means; and
at least one of an attachment and a locking means, wherein said reference gray scale housing is one of attached and locked to said housing support means by said one of said attachment and locking means, and further wherein said reference gray scale housing is one of adjustable and positionable at least one of vertically and horizontally.

2. A video monitor contrast reference gray scale apparatus comprising:

a reference gray scale housing;

a reference gray scale which comprises a plurality of fields which provide a contrast range on said reference gray scale;

a light source which is located inside said reference gray scale housing and which provides illumination to said reference gray scale; and a power supply for providing power to said light source;

wherein said reference gray scale is located in said reference gray scale housing, and further wherein said power supply provides power to said light source so as to provide illumination of said reference gray scale, wherein said reference gray scale housing further comprises:
a housing which comprises a plurality of one of fields and openings; and
a frame which comprises a plurality of one of fields and openings, and which further comprises supports for placement therein of filters,
wherein said housing and said frame are positionable in relation to one another and are utilized together to form said reference gray scale.

3. A video monitor contrast reference gray scale apparatus, comprising:

a reference gray scale housing;

a reference gray scale which comprises a plurality of fields which provide a contrast range on said reference gray scale;

a light source which is located inside said reference gray scale housing and which provides illumination to said reference gray scale; and a power supply for providing power to said light source;

wherein said reference gray scale is located in said reference gray scale housing, and further wherein said power supply provides power to said light source so as to provide illumination of said reference gray scale, and further wherein said reference gray scale has a contrast range of at least one of 1:128 and 1:60.

4. A video monitor contrast reference gray scale apparatus, comprising:

a reference gray scale housing;

a reference gray scale which comprises a plurality of fields which provide a contrast range on said reference gray scale;

a light source which is located inside said reference gray scale housing and which provides illumination to said reference gray scale; and a power supply for providing power to said light source;

wherein said reference gray scale is located in said reference gray scale housing, and further wherein said power supply provides power to said light source so as to provide illumination of said reference gray scale, and further wherein said light source is adjustable as to light intensity while having a constant light color temperature.

5. A video monitor contrast reference gray scale apparatus, comprising:

a reference gray scale housing;

a reference gray scale which comprises a plurality of fields which provide a contrast range on said reference gray scale;

a light source which is located inside said reference gray scale housing and which provides illumination to said reference gray scale; and a power supply for providing power to said light source;

wherein said reference gray scale is located in said reference gray scale housing, and further wherein said power supply provides power to said light source so as to provide illumination of said reference gray scale, wherein said reference gray scale comprises a plurality of filters, and further wherein at least one of said plurality of filters is reproduced on a matte surface.

6. A method for matching a contrast range of a reference gray scale with a contrast range of a film camera negative, in conjunction with a camera viewfinder, comprising the steps of:

adjusting an illumination level of a camera viewfinder reference gray scale in accordance with a film speed and a camera lens F stop setting by using one of a reference and a metering device;

determining whether a darkest object of an image in a viewing field of said camera viewfinder matches with a selected darkest field of a said viewfinder reference gray scale; and adjusting at least one of a camera lens F stop setting and a filming set lighting so that said darkest image matches, in contrast, with a selected darkest field of said viewfinder reference gray scale.

7. A contrast reference scale apparatus for use with a video monitor and a film camera, comprising:

a reference gray scale housing;

a reference gray scale which comprises a plurality of fields which provide a contrast range on said reference gray scale;

a light source which is located inside said reference gray scale housing and which provides illumination to said reference gray scale; and a power supply for providing power to said light source;

wherein said reference gray scale is located in said reference gray scale housing and further wherein said power supply provides power to said light source so as to provide illumination of said reference gray scale, wherein said contrast reference scale apparatus further comprising:

a reference gray scale housing support means; and at least one of an attachment and a locking means, wherein said reference gray scale housing is one of attached and locked to said housing support means by said one of said attachment and locking means, and further wherein said reference gray scale housing is one of adjustable and positionable at least one of vertically and horizontally.

8. A contrast reference scale apparatus for use with a video monitor and a film camera, comprising:

a reference gray scale housing;

a reference gray scale which comprises a plurality of fields which provide a contrast range on said reference gray scale;

a light source which is located inside said reference gray scale housing and which provides illumination to said reference gray scale; and a power supply for providing power to said light source;

wherein said reference gray scale is located in said reference gray scale housing, and further wherein said power supply provides power to said light source so as to provide illumination of said reference gray scale, wherein said reference gray scale housing further comprises:

a housing which comprises a plurality of one of fields and openings; and a frame which comprises a plurality of one of fields and openings, and which further comprises supports for placement therein of filters, wherein said housing and said frame are positionable in relation to one another and are utilized together to form said reference gray scale.

9. A contrast reference scale apparatus for use with a video monitor and a film camera, comprising:

a reference gray scale housing;

a reference gray scale which comprises a plurality of fields which provide a contrast range on said reference gray scale;

a light source which is located inside said reference gray scale housing and which provides illumination to said reference gray scale; and a power supply for providing power to said light source;

wherein said reference gray scale is located in said reference gray scale housing, and further wherein said power supply provides power to said light source so as to provide illumination of said reference gray scale;

wherein said reference gray scale has a contrast range of at least one of 1:128 and 1:60.

10. A contrast reference scale apparatus for with a video monitor and a film camera, comprising:

a reference gray scale housing;

a reference gray scale which comprises a plurality of fields which provide a contrast range on said reference gray scale;

a light source which is located inside said reference gray scale housing and which provides illumination to said reference gray scale; and a power supply for providing power to said light source;

wherein said reference gray scale is located in said reference gray scale housing, and further wherein said power supply provides power to said light source so as to provide illumination of said reference gray scale;

wherein said light source is adjustable as to light intensity while having a constant light color temperature.

11. A contrast reference scale apparatus for use with a video monitor and a film camera, comprising:

a reference gray scale housing;

a reference gray scale which comprises a plurality of fields which provide a contrast range on said reference gray scale;

a light source which is located inside said reference gray scale housing and which provides illumination to said reference gray scale; and a power supply for providing power to said light source;

wherein said reference gray scale is located in said reference gray scale housing, and further wherein said power supply provides power to said light source so as to provide illumination of said reference gray scale, wherein said reference gray scale further comprises a plurality of filters, and further wherein at least one of said plurality of filters is reproduced on a matte surface.

* * * * *